United States Patent
Li et al.

(10) Patent No.: US 7,885,339 B2
(45) Date of Patent: Feb. 8, 2011

(54) BI-DIRECTIONAL TEMPORAL ERROR CONCEALMENT

(75) Inventors: Jiang Li, Beijing (CN); Keman Yu, Beijing (CN); Shipeng Li, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1356 days.

(21) Appl. No.: 10/990,425

(22) Filed: Nov. 17, 2004

(65) Prior Publication Data

US 2006/0104365 A1   May 18, 2006

(51) Int. Cl.
*H04N 7/12* (2006.01)

(52) U.S. Cl. .................. 375/240.27; 375/240.16; 375/240.15; 375/240.24; 375/240.26; 375/240.01; 375/240.12

(58) Field of Classification Search .............. None
See application file for complete search history.

(56) References Cited

U.S. PATENT DOCUMENTS

| | | | | |
|---|---|---|---|---|
| 5,136,378 A * | 8/1992 | Tsurube | ............... | 348/415.1 |
| 5,621,467 A * | 4/1997 | Chien et al. | ............... | 375/240.15 |
| 6,704,363 B1 * | 3/2004 | Kim | ............... | 375/240.27 |
| 7,324,698 B2 * | 1/2008 | Kong et al. | ............... | 382/236 |
| 2005/0196053 A1 * | 9/2005 | Pore et al. | ............... | 382/233 |
| 2006/0062304 A1 * | 3/2006 | Hsia | ............... | 375/240.16 |
| 2006/0104366 A1 * | 5/2006 | Huang et al. | ............... | 375/240.27 |
| 2007/0014359 A1 * | 1/2007 | Gomila et al. | ............... | 375/240.16 |
| 2008/0144716 A1 * | 6/2008 | De Haan | ............... | 375/240.16 |

OTHER PUBLICATIONS

Mancini et al., "Robust Quadtree-based Disparity Estimation for the Reconstruction of Intermediate Stereoscopic Images," USA SPIE, Jan. 1998.*

* cited by examiner

*Primary Examiner*—Andy S. Rao
*Assistant Examiner*—Geepy Pe
(74) *Attorney, Agent, or Firm*—Lee & Hayes, PLLC

(57) ABSTRACT

Systems and methods for bi-directional temporal error concealment are described. In one aspect, a lost frame is detected during encoded video decoding operations. Bi-directional estimations for each pixel of the lost frame are calculated to generate a current frame for bi-directional temporal error concealment of the lost frame.

22 Claims, 7 Drawing Sheets

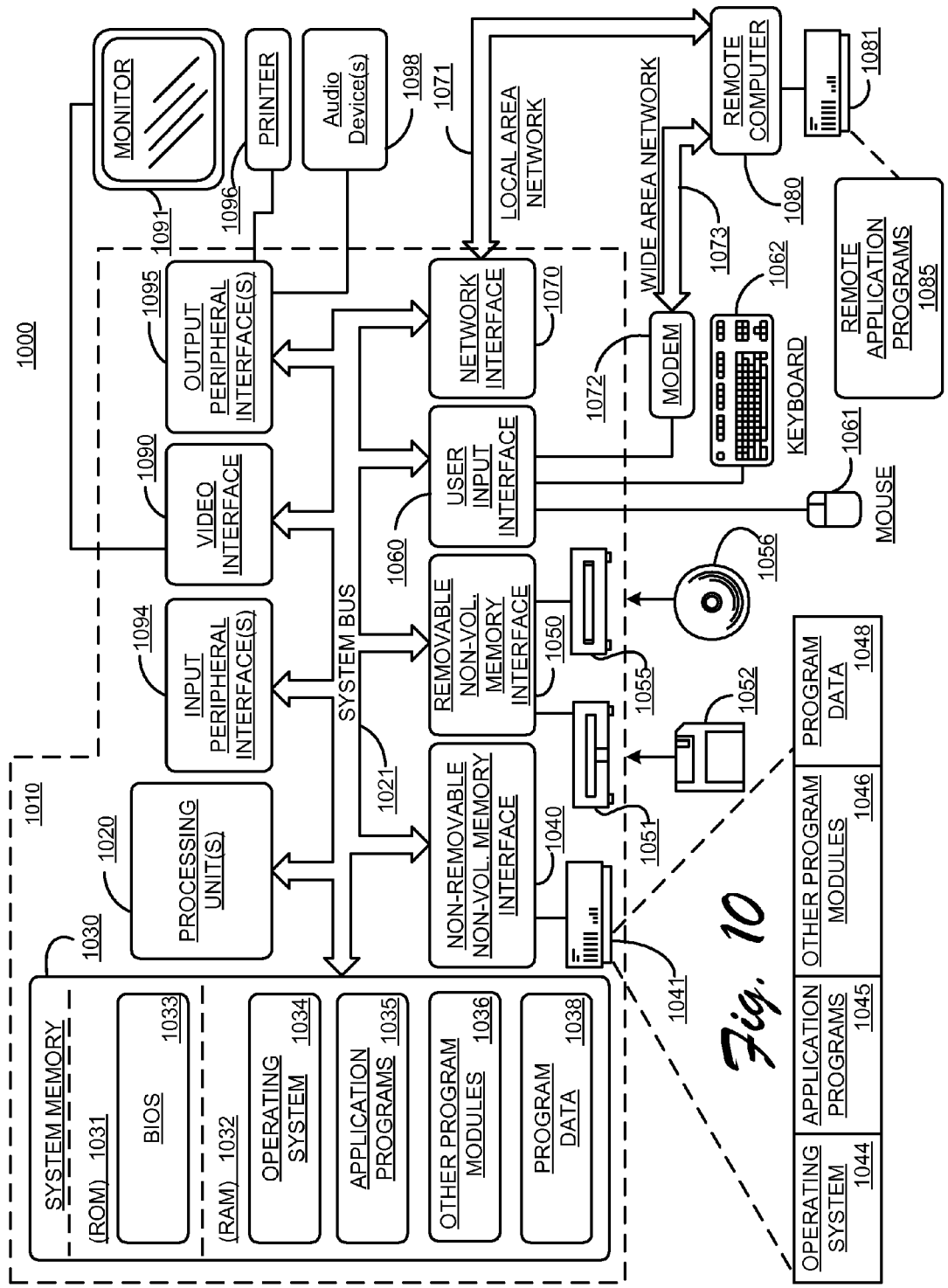

BI-DIRECTIONAL TEMPORAL ERROR CONCEALMENT

TECHNICAL FIELD

This disclosure relates to video decoding.

BACKGROUND

With the rapid development of wired and wireless networks, more and more users are seeking video services, including video streaming and video conferencing over the Internet. However, the Internet does not provide guaranteed quality of service (QoS). Traffic congestion usually results in the loss of data packets. A lost packet/frame is detected when a next data packet or image frame is received while the previous data packet or image frame has not been received for a certain time. In wireless networks, packet losses happen frequently due to multi-path fading, shadowing and noise disturbance of wireless channels. Although existing error concealment techniques can typically deal with the loss of macroblocks, existing error concealment techniques cannot adequately reconstruct or handle the loss of an entire frame.

Frame loss is commonplace in video transmission, typically resulting in severe distortions to decoded/reconstructed video data. To save transmission overhead, one data packet may carry information for an entire video frame. Thus, loss of a single packet in a low bit rate application may result in loss of an entire frame. Additionally, and in high bit rate applications, traffic congestion may cause a burst of packet/frame losses. Moreover, and to make matters worse, if a spatial-temporal predictive coding scheme is utilized to achieve high compression efficiency, an erroneously recovered block (due to packet/frame loss) may lead not only to errors in the subsequent blocks in the same frame, but also propagate errors to subsequent frames.

SUMMARY

Systems and methods for bi-directional temporal error concealment are described. In one aspect, a lost frame is detected during encoded video decoding operations. Bi-directional estimations for each pixel of the lost frame are calculated to generate a current frame for bi-directional temporal error concealment of the lost frame.

BRIEF DESCRIPTION OF THE DRAWINGS

In the Figures, the left-most digit of a component reference number identifies the particular Figure in which the component first appears.

FIG. 10 shows an example of a suitable computing environment in which systems and methods for bidirectional temporal error concealment may be fully or partially implemented.

DETAILED DESCRIPTION

Overview

To control errors in video transmission, many video encoding techniques and decoder error concealment methods have been developed. One such error concealment technique is temporal error concealment, which assumes that motion in the video is smooth or continuous. In general, temporal error concealment replaces a damaged block with content of a previous frame at a motion-compensated location. The limitation to such an approach is that it relies on the knowledge of motion information that may not be available in all situations, especially when a whole frame is lost.

Motion vector extrapolation (MVE) and multi-frame motion averaging (MMA) are other error concealment techniques that attempt to accurately estimate lost motion information. In MVE, motion vectors are extrapolated from the last received frame. For each 8×8 block in the current frame, its motion vector is determined by the extrapolated macroblock that possesses the largest overlapped area on it. In stationary and slow motion scenes, where the last received frame is highly temporally correlative to the current frame, MVE can yield relatively satisfactory results. However, due to the rough motion vectors, of 8×8 pixel size, and the missing of residual information, this method usually introduces obvious block artifacts. In particular, the method may give erroneously estimated motions in large motion scenes, as illustrated in FIG. 1.

Figure 1:
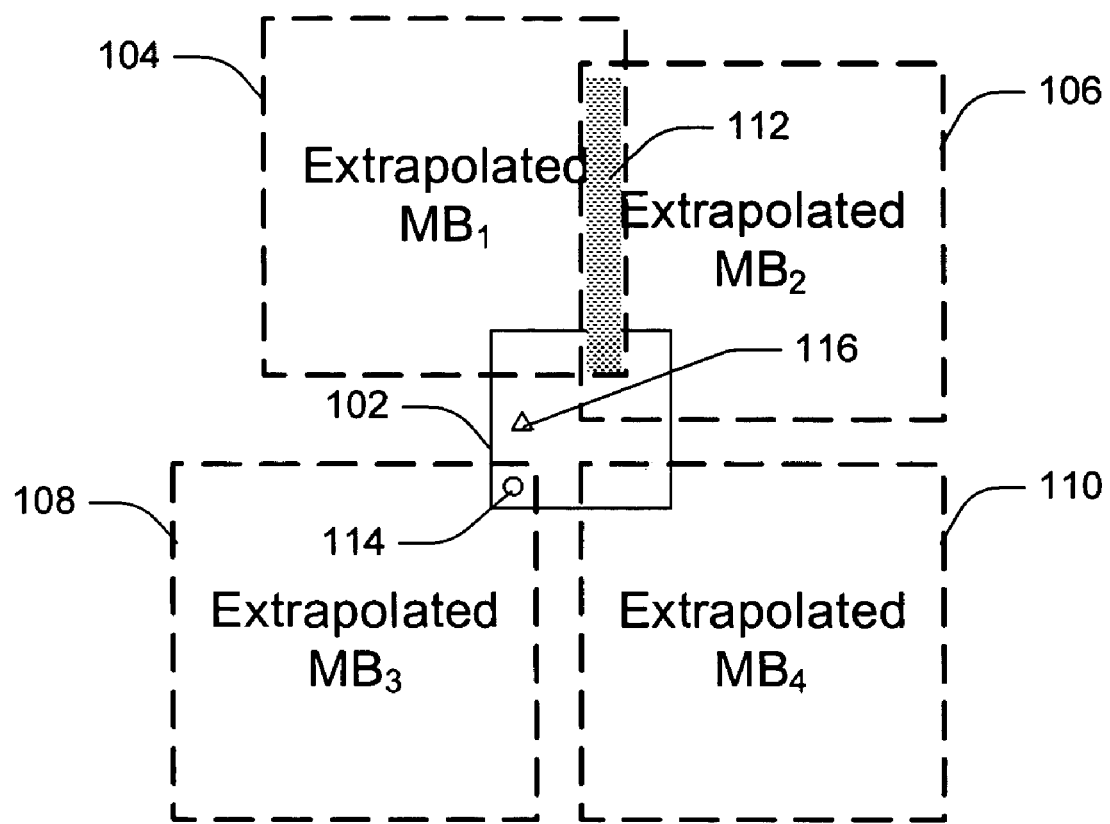
FIG. 1 shows an exemplary use of motion vector extrapolation (MVE) to attempt to estimate lost motion information.

FIG. 1 shows an exemplary use of MVE to attempt to estimate lost motion information. Central square 102 represents an 8×8 block that is lost. The central block overlaps with four macroblocks 104 through 110 that are extrapolated from a last frame. Although the largest overlapped area 112 belongs to $MB_2$, it is still a small portion of the whole damaged block 102. Therefore it is improper to use the motion vector of $MB_2$ to represent the motions of all pixels in the missing block 102. In this case, there is not an extrapolated macroblock that covers the majority of the damaged block. In this scenario, and due to the missing information in the damaged block, MVE typically introduces obvious block artifacts resulting from erroneously estimated motions. This situation appears frequently in large motion scenes. To achieve more smooth and fine results, pixel-based estimation method is desired.

MMA is a pixel-based temporal error concealment method. It starts from a last received frame. MMA inversely tracks the motion of each pixel in a few past frames, and then averages the motion vectors in the trace to estimate the forward motion vector of the last received frame. This method can smooth the boundaries of blocks at stationary areas, but fails with respect to areas representing motion.

In contrast to the above described techniques, the following systems and methods provide bi-directional temporal error concealment when decoding video data. These systems and methods resolve the loss of an entire frame. This is in stark contrast to existing error decoding techniques, which generally cannot recover an entire missing frame. More particularly, bi-directional temporal error concealment, for each pixel in a lost frame of video data, extrapolates two motion vectors from the motion vectors of the previous reconstructed frame and the next frame. The lost pixel is then reconstructed using multi-hypothesis motion compensation. Such bi-directional temporal error concealment does not increase bit rate, or delay. In this implementation, bi-directional temporal error concealment is implemented with respect to low bit rate real-time video communications.

These and other aspects of the systems and methods for bi-directional temporal error concealment are now described in greater detail.

An Exemplary System

Figure 2:
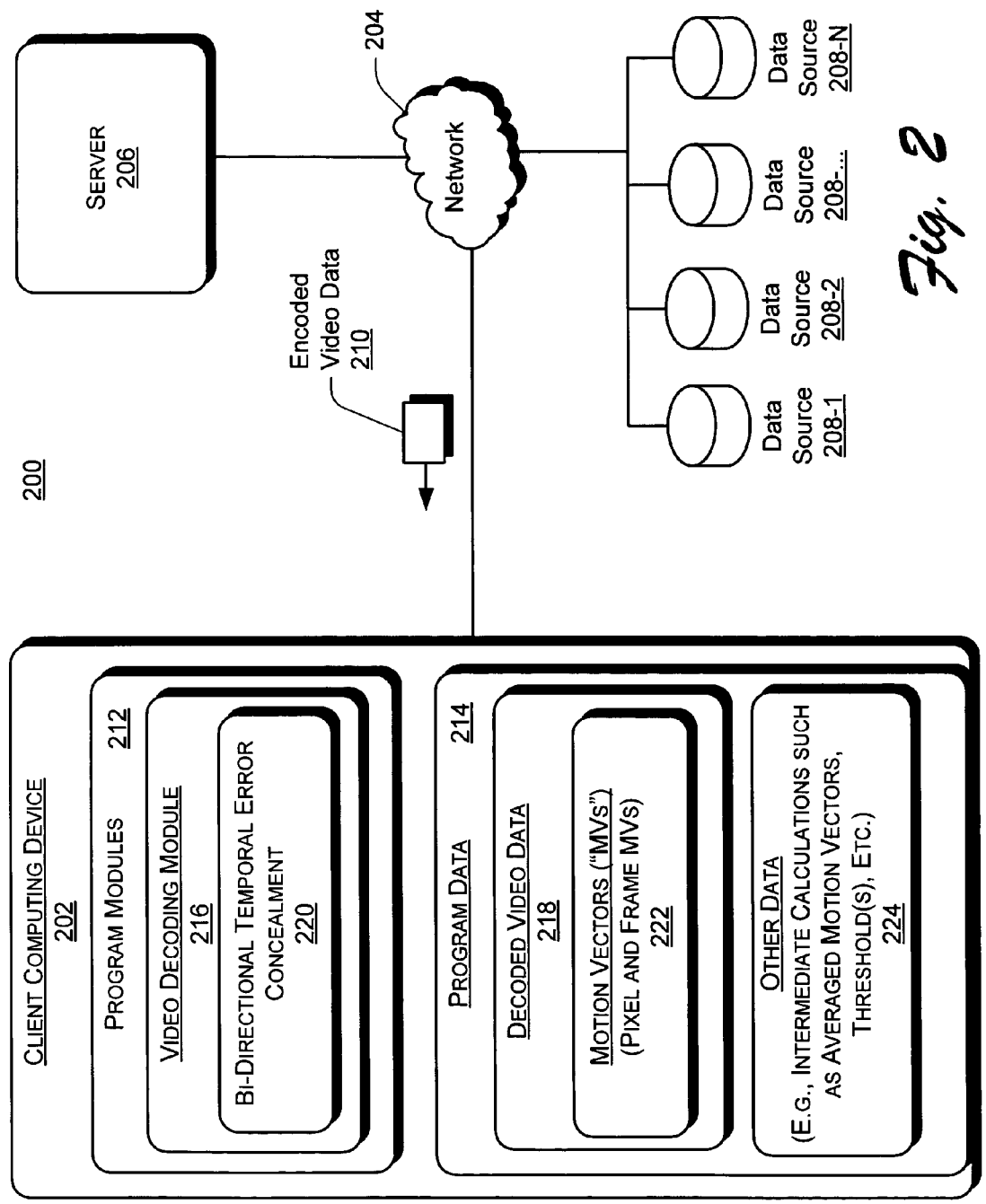
FIG. 2 illustrates an exemplary system for bi-directional temporal error concealment.

FIG. 2 shows an exemplary system 200 for bi-directional temporal error concealment. In this implementation, system 200 includes client computing device 202 coupled across a communications network 204 to a server 206, which in turn is coupled to any number of data repositories 208-1 through 208-N for storing video data. Network 204 may include any combination of a local area network (LAN) and a general wide area network (WAN) communication environments, such as those which are commonplace in offices, enterprise-wide computer networks, intranets, and the Internet. Client computing device 202 is any type of computing device such as a personal computer, a laptop, a server, handheld or mobile computing device (e.g., a cellular phone, personal digital assistant), and/or so on.

In this implementation, client computing device 202 receives encoded video data 210 from server 206. In another implementation, the encoded video data 210 is received from another entity such as from a CD-ROM, DVD, etc. The server may encode the video data using any one or more video encoding techniques such as those performed by an H.261, H.263, H.264, or MPEG 1/2/4 video encoder, and/or the like. Client computing device 202 decodes encoded video data 210 and recovers any lost frame(s) with bi-directional error concealment operations. To this end, client computing device 202 includes program modules 212 and program data 214. The program modules include, for example, video decoding module 216. Video decoding module 216 decodes encoded video data 210 to generate decoded video data 218. Video decoding module 216 implements operations of bi-directional temporal error concealment module 220 to recover a lost video frame when data for the frame is missing from the encoded data 210. The operations of program module 220 are bi-directional because they are forward and backward estimating, as described below.

Exemplary Forward Estimation

To recover a first aspect of a lost video frame, bi-directional temporal error concealment module 218 implements forward estimating pixel-based MVE operations. These operations differ from block-based MVE in at least the following two ways:
1. For a pixel (a portion of decoded video data 218) that is covered by at least one extrapolated macroblock (MB), such as the circle points 114 of FIG. 1, the pixel's estimated motion vector 222 is estimated by averaging motion vectors 222 of all overlapped MBs—an overlapped MB is only an MB that overlaps the pixel; and
2. For a pixel that is not covered by any of the extrapolated MBs, such as the triangle point 116 of FIG. 1, the pixel's estimated motion vector 222 is duplicated from the motion vector 222 of the same pixel in the previous frame. As a side note, spatial interpolators, such as mean filter and median filter do not provide better performance than this technique. This is because it is highly probable that the pixel neighbors surrounding the missing pixel are also empty.

In this implementation, in stationary or little motion video scenes, video decoding module 216 repeats motion vectors 222 of a previous frame. A pixel that is covered by more than one extrapolated MB is called a multi-covered pixel. In general, video scenes that possess large motion also have a large number of multi-covered pixels. Thus, bi-directional temporal error concealment 220, for a frame (a respective portion of decoded video data 218) that has the number of multi-covered pixels smaller than a threshold T, directly duplicates the frame's motion vectors 222 from the corresponding motion vectors 222 of its previous frame. For purposes of illustration, threshold T is shown as a respective portion of "other data" 224.

In this implementation, T for QCIF size videos is 2,000. In other implementations, T is an arbitrary value selected as a function of the image size of the associated decoded video data 218.

If an estimated motion vector 222 is represented as $f=(f_x, f_y)$, bi-directional temporal error concealment 220 recovers each lost pixel $p_f(x, y)$ as follows:

$$p_f(x,y)=p_{rf}(x+f_x, y+f_y) \quad (1),$$

wherein $p_{rf}(x,y)$ refers to pixels in the previous frame.

Figure 3:
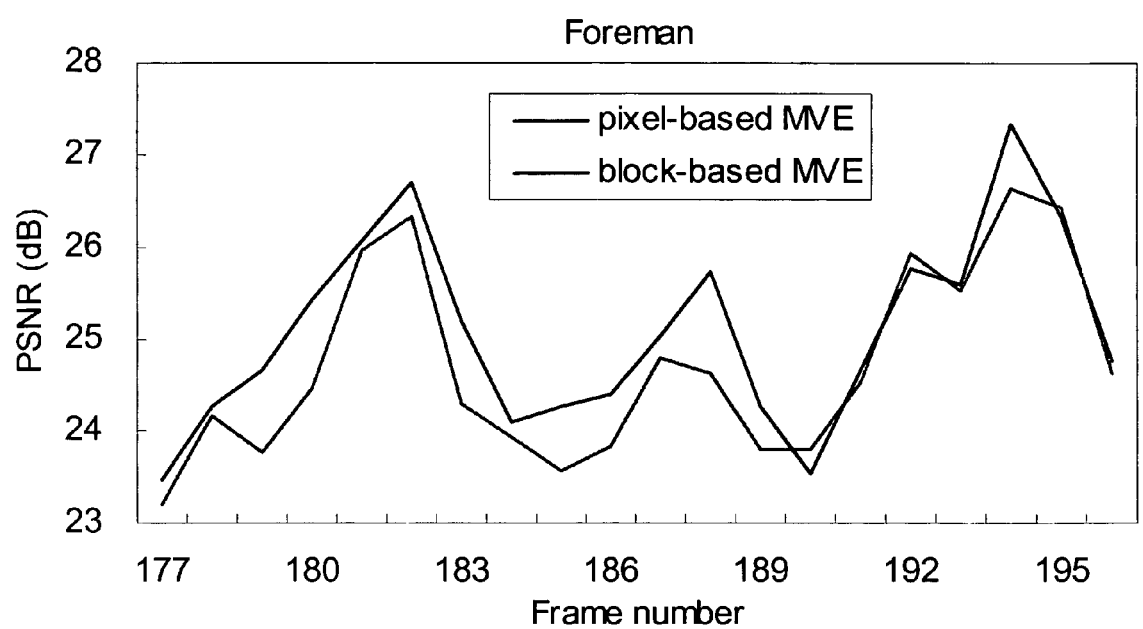
FIG. 3 shows as exemplary comparison of frame-by-frame concealment performance between pixel-based MVE and block-based MVE.

FIG. 3 shows as exemplary comparison of frame-by-frame concealment performance between pixel-based MVE and block-based MVE at 15 fps and 128 kbps. As shown, the pixel-based MVE operations implemented in large motion scenes by bi-directional temporal error concealment module 220 are substantially optimized. The value of each point is obtained when the corresponding frame is lost while all the other frames are correctly received.

Exemplary Backward Estimation

Most existing temporal error concealment techniques utilize only the information of past frames. However, the information of a next frame is usually also available, because we are not aware of the loss of the current frame until we receive the next frame. Besides the forward-based estimations of the pixel-based MVE described above, bi-directional temporal error concealment module 220 implements backward estimation by extrapolating motion vectors 222 from a next frame after a missing frame. However, pixel values of the next frame are not available until the current frame is recovered. Bi-directional temporal error concealment module 220 solves this problem by compensating each pixel $p_b(x, y)$ of the lost frame on the last reconstructed frame using the backward estimated motion vector $(b_x, b_y)$.

$$p_b(x,y)=p_{rb}(x+b_x, y+b_y) \quad (2),$$

wherein $p_{rb}(x, y)$ refers to pixels in the last reconstructed frame (part of decoded video data 218)

Error concealment performance of the forward and backward pixel-based MVE operations is shown in Table 1. The Foreman, Suzie, and Miss_am images, which respectively represent small, moderate, and large motion scenes, are standard images in the encoding and decoding industry. As indicated, the backward method is more efficient than the forward operations.

TABLE 1

CONCELEALMENT PERFORMANCE
IN TERMS OF PSNR (dB)

| Data | Forward | Backward |
|---|---|---|
| Foreman | 29.19 | 29.49 |
| Suzie | 32.79 | 33.19 |
| Miss_am | 38.65 | 38.93 |

Exemplary Bi-Directional Compensation

Bi-directional temporal error concealment module 220 obtains two estimations of a current frame (the missing frame) with the described forward and backward estimations. Bi-directional temporal error concealment module 220 combines these forward and backward pixel-based MVE operations for pixel (x, y) in the lost frame. More particularly, pixel value p(x, y) is estimated as follows:

$$p(x,y)=w \times p_f(x,y)+1-w) \times p_b(x,y) \quad (3),$$

wherein pixel-based weight w=w(x, y) is used to adjust the weights of the forward and backward methods.

In this implementation, w(x, y)=0.5 to simply average the two candidate concealments. In another implementation, the multi-hypothesis weights are adaptively adjusted. For example, the weights can be adjusted in terms of the correlativity between the adjacent frames, with additional weight being provide to a candidate that possesses higher correlation to a lost frame.

Figure 4:
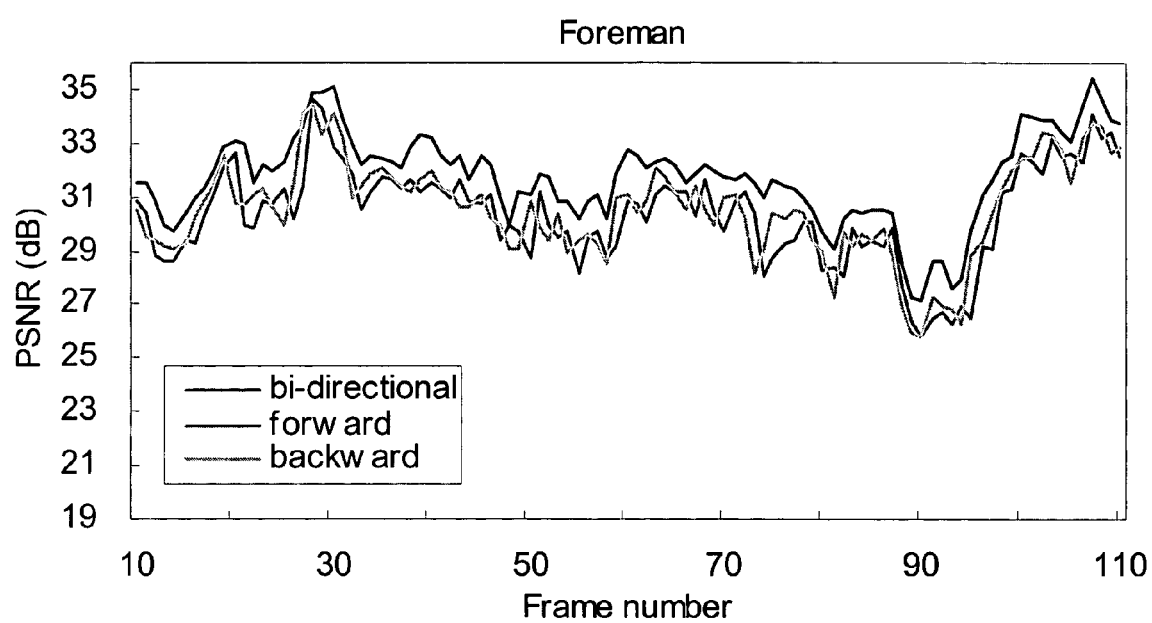
FIG. 4 shows an exemplary comparison of the error concealment performance of the forward, backward and bi-directional operations implemented by the system of FIG. 1 for the QCIF Foreman sequence.

FIG. 4 shows an exemplary comparison of the error concealment performance of the forward, backward and bidirectional operations for the QCIF Foreman sequence coded at 15 fps and 128 kbps. The Foreman sequence is a well-known sequence in the video encoding and decoding industries. As illustrated in FIG. 4, the bi-directional method almost consistently outperforms the other two respective independent methods.

Figure 5:
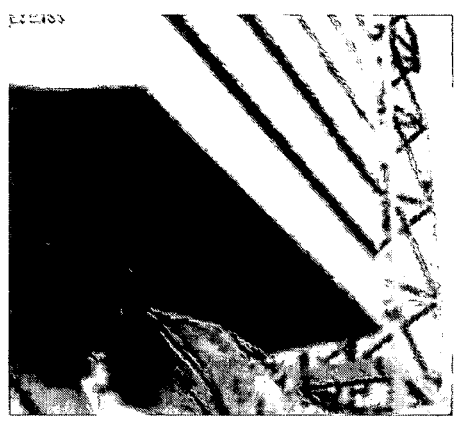
FIG. 5 shows the 180th frame of the Foreman video sequence error-free.
Figure 6:
FIG. 6 shows the 180th frame of the Foreman video sequence recovered by MVE techniques.
Figure 7:
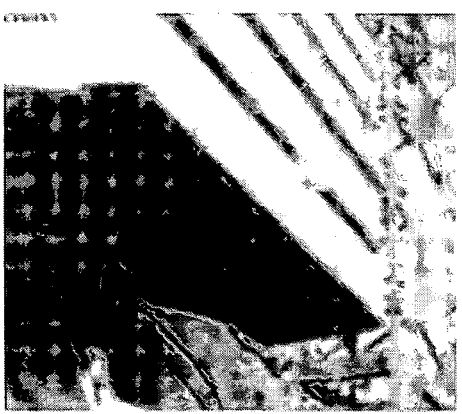
FIG. 7 shows the 180th frame of the Foreman video sequence recovered with MMA techniques.
Figure 8:
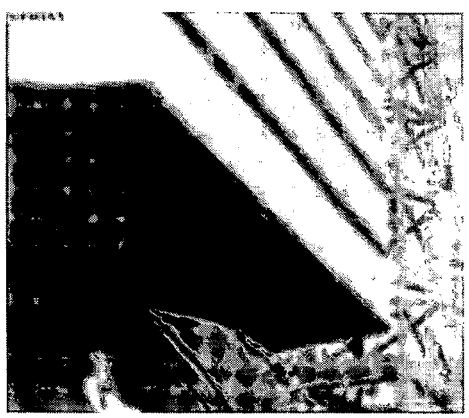
FIG. 8 shows the 180th frame of the Foreman video sequence recovered by the operations of bi-directional error concealment module of FIG. 1.

FIGS. 5 through 8 show exemplary subjective qualities of respective error free and recovered frames of the 180th frame of the Foreman video sequence. More particularly, FIG. 5 shows the 180th frame of the Foreman video sequence error-free. FIG. 6 shows the 180th frame of the Foreman video sequence recovered by MVE techniques. FIG. 7 shows the 180th frame of the Foreman video sequence recovered with MMA techniques. FIG. 8 shows the 180th frame of the Foreman video sequence recovered by the operations of bi-directional temporal error concealment module 120 of FIG. 1. The image of FIG. 6 recovered by MVE has obvious block artifacts in the face area. The image of FIG. 7 recovered by MMA is smooth in the face area but possesses severe distortions in the background. Whereas, the image of FIG. 8, which was recovered by bi-directional temporal error concealment module 120 operations as described above, provides a vivid presentation of the recovered frame as compare to the recovered frames of FIGS. 5 through 7.

An Exemplary Procedure

Figure 9:
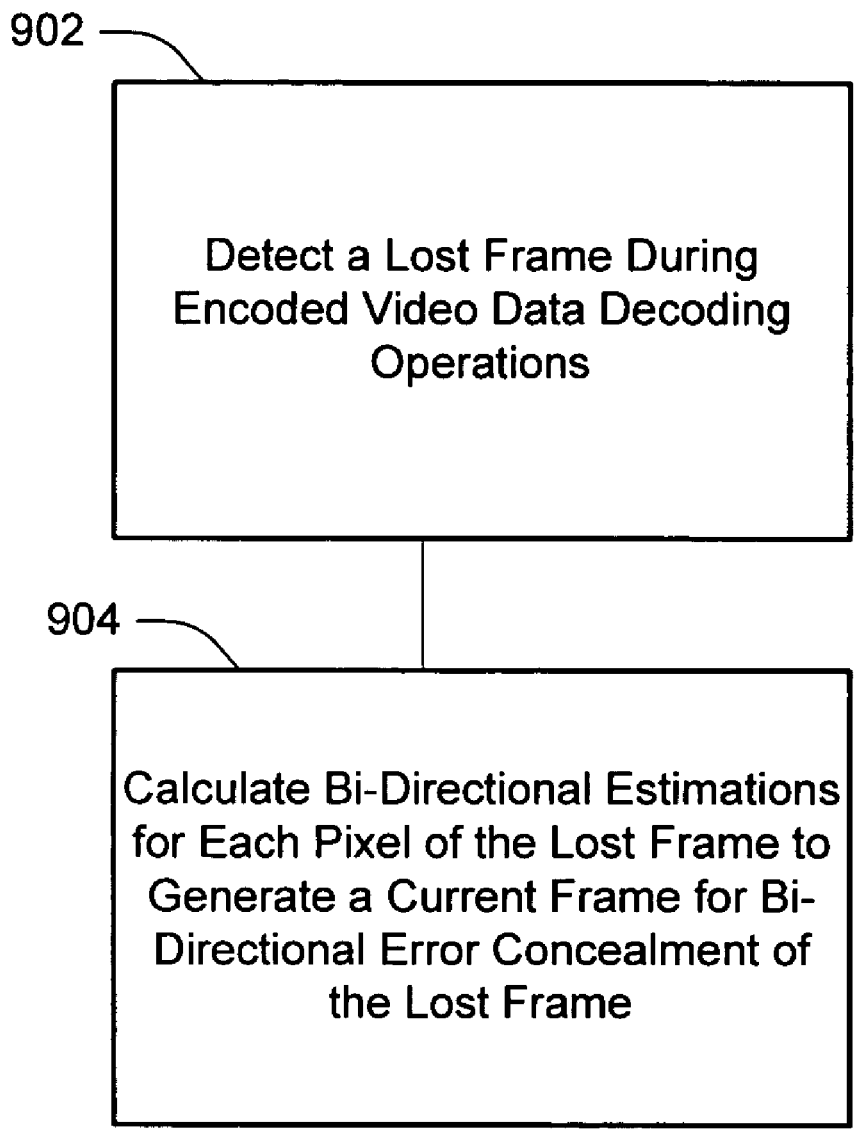
FIG. 9 shows an exemplary procedure for bi-directional temporal error concealment.

FIG. 9 shows an exemplary procedure 900 for bi-directional temporal error concealment to recover lost frame(s) in a video data sequence. For purposes of discussion, the operations of this procedure are described with respect to aspects of FIG. 2. The left-most digit of a component reference number identifies the particular figure in which the component first appears. At block 902, video decoding module 216 (FIG. 1), detects a missing frame while decoding encoded video data 210. At block 904, the video decoding module calculates bi-directional estimations for each pixel of the missing frame to generate a current frame for bi-directional temporal error concealment of the missing frame. Detailed aspects of these operations were described above.

An Exemplary Operating Environment

Although not required, the systems and methods for block importance analysis to enhance browsing of web page search results have been described in the general context of computer-executable instructions (program modules) being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

FIG. 10 shows an example of a suitable computing environment in which systems and methods for bi-directional temporal error concealment may be fully or partially implemented. Exemplary computing environment 1000 is only one example of a suitable computing environment for the exemplary system of FIG. 2 and exemplary operations of FIG. 9, and is not intended to suggest any limitation as to the scope of use or functionality of systems and methods the described herein. Neither should computing environment 1000 be interpreted as having any dependency or requirement relating to any one or combination of components illustrated in computing environment 1000.

The methods and systems described herein are operational with numerous other general purpose or special purpose computing system, environments or configurations. Examples of well-known computing systems, environments, and/or configurations that may be suitable for use include, but are not limited to, mobile computing devices such as mobile phones and personal digital assistants, personal computers, server computers, multiprocessor systems, microprocessor-based systems, network PCs, minicomputers, mainframe computers, distributed computing environments that include any of the above systems or devices, and so on. The invention is practiced in a distributed computing environment where tasks are performed by remote processing devices that are linked through a communications network. In a distributed computing environment, program modules may be located in both local and remote memory storage devices.

With reference to FIG. 10, an exemplary system for bi-directional temporal error concealment includes a general purpose computing device in the form of a computer 1010 implementing, for example, server 206 of FIG. 2. Components of computer 1010 may include, but are not limited to, processing unit(s) 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 1010 typically includes a variety of computer-readable media. Computer-readable media can be any available media that can be accessed by computer 1010 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above should also be included within the scope of computer-readable media.

System memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example and not limitation, FIG. 10 illustrates operating system 1034, application programs 1035, other program modules 1036, and program data 1038.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046, and program data 1048. Note that these components can either be the same as or different from operating system 1034, application programs 1035, other program modules 1036, and program data 1038. Application programs 1035 includes, for example program module(s) 212 of FIG. 2. Program data 1038 includes, for example, program data 214 of FIG. 2. Operating system 1044, application programs 1045, other program modules 1046, and program data 1048 are given different numbers here to illustrate that they are at least different copies.

A user may enter commands and information into the computer 1010 through input devices such as a keyboard 1062 and pointing device 1061, commonly referred to as a mouse, trackball or touch pad. Other input devices (not shown) may include a microphone, joystick, game pad, satellite dish, scanner, or the like. These and other input devices are often connected to the processing unit 1020 through a user input interface 1060 that is coupled to the system bus 1021, but may be connected by other input peripheral interface(s) 1094 and bus structures, such as a parallel port, game port, or a universal serial bus (USB).

A monitor 1091 or other type of display device is also connected to the system bus 1021 via an interface, such as a video interface 1090. In addition to the monitor, computers may also include other peripheral output devices such as speakers 1098 and printer 1096, which may be connected through an output peripheral interface 1095.

The computer 1010 operates in a networked environment using logical connections to one or more remote computers, such as a remote computer 1080. In one implementation, remote computer 1080 represents server 206 of FIG. 2. The remote computer 1080 may be a mobile computing device, a personal computer, a server, a router, a network PC, a peer device or other common network node, and as a function of its particular implementation, may include many or all of the elements described above relative to the client computing device 202, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example and not limitation, FIG. 10 illustrates remote application programs 1085 as residing on memory device 1081. The network connections shown are exemplary and other means of establishing a communications link between the computers may be used.

CONCLUSION

Although the systems and methods for block importance analysis to enhance browsing of web page search results have been described in language specific to structural features and/or methodological operations or actions, it is understood that the implementations defined in the appended claims are not necessarily limited to the specific features or actions described. For example, although client computing device 202 of FIG. 2 has been described as receiving encoded video data 210 from server 206, client computing device 202 can also receive encoded video data 210 from other data source(s) such as via a hard drive, a CD-ROM, DVD, and/or so on. Accordingly, the specific features and operations are disclosed as exemplary forms of implementing the claimed subject matter.

The invention claimed is:

1. A method comprising:
   detecting a lost frame during encoded video decoding operations, the lost frame comprising a plurality of pixels and a plurality of macroblocks;
   calculating, via one or more processors, bi-directional estimations for each pixel of the lost frame, wherein the calculating further comprises:
      in an event a pixel of the lost frame is not covered by at least one extrapolated macroblock, determining forward pixel-based motion vector extrapolation estimations by duplicating a motion vector of a similarly situated pixel as the pixel in a previous frame to the lost frame, the motion vector being an estimated motion vector for the pixel; and
   generating a current frame for a bi-directional temporal error concealment of the lost frame; and
   recovering the lost frame with bi-directional error concealment operations.

2. A method as recited in claim 1, wherein the bi-directional estimations comprise forward and backward pixel-based motion vector extrapolation estimations.

3. A method as recited in claim 1, wherein the bi-directional estimations comprise forward pixel-based motion vector extrapolation estimations such that when an estimated motion vector for a missing pixel of the lost frame is represented as $f=(f_x, f_y)$, a forward estimation of a motion vector of the missing pixel $p_f(x, y)$ is calculated such that $p_f(x,y)=p_{rf}(x+f_x,y+f_y)$, wherein $p_{rf}(x, y)$ refers to pixels in a previous frame to the lost frame.

4. A method as recited in claim 1, wherein the calculating further comprises:
   in an event the pixel of the lost frame is covered by one or more extrapolated macroblocks:
      determining forward pixel-based motion vector extrapolation estimations by averaging motion vector(s) of the one or more extrapolated macroblocks overlapping the pixel to determine an estimated motion vector for the pixel; and
      determining backward pixel-based motion vector extrapolation estimations comprising compensating the pixel of the lost frame on a last reconstructed frame using a backward estimated motion vector.

5. A method as recited in claim 1, wherein the calculating the bi-directional estimations for each pixel of the lost frame further comprises:
   combining forward and backward pixel-based MVE operations as follows:
   estimating a pixel p value $p(x, y)$ of the lost frame as $p(x,y)=w \times p_f(x,y)+(1-w) \times p_b(x,y)$, wherein:
   an estimated motion vector for a missing pixel p of the lost frame is represented as $f=(f_x, f_y)$,
   a forward estimation of a motion vector of the missing pixel $p_f(x, y)$ is calculated such that $p_f(x,y)=p_{rf}(x+f_x,y+f_y)$,
   $p_{rf}(x, y)$ refers to pixels in a previous frame to the lost frame,
   a backward b estimated motion vector is represented as $(b_x, b_y)$,
   $p_b(x,y)=p_{rb}(x+b_x,y+b_y)$, wherein $p_{rb}(x, y)$ refers to pixels in the last reconstructed frame r, and
   pixel-based weight $w=w(x, y)$ adjusts weights of the forward and backward pixel-based MVE operations.

6. A computer-readable storage medium embedded with computer-programmable instructions executable by a processor that, when executed by the processor, cause the processor to perform acts, comprising:
   detecting a lost frame during encoded video decoding operations, the lost frame comprising a plurality of pixels and a plurality of macroblocks;
   calculating bi-directional estimations for each pixel of the lost frame, wherein the bi-directional estimations comprise backward pixel-based motion vector extrapolation estimations generated by computer-program instructions for compensating a pixel of the lost frame on a last reconstructed frame using a backward estimated motion vector;
   generating a current frame for a bi-directional temporal error concealment of the lost frame; and
   recovering the lost frame with bi-directional error concealment operations.

7. A computer-readable storage medium as recited in claim 6, wherein the bi-directional estimations comprise forward and backward pixel-based motion vector extrapolation estimations.

8. A computer-readable storage medium as recited in claim 6, wherein the bi-directional estimations comprise forward pixel-based motion vector extrapolation estimations such that when an estimated motion vector for a missing pixel of the lost frame is represented as $f=(f_x, f_y)$, a forward estimation of a motion vector of the missing pixel $p_f(x, y)$ is calculated such that $p_f(x,y)=p_{rf}(x+f_x,y+f_y)$, wherein $p_{rf}(x, y)$ refers to pixels in a previous frame to the lost frame.

9. A computer-readable storage medium as recited in claim 6, wherein in an event a pixel of the lost frame is not covered by one or more extrapolated macroblocks, the computer-program instructions for calculating further comprise instructions for determining forward pixel-based motion vector extrapolation estimations by duplicating a motion vector of a similarly situated pixel as the pixel in a previous frame to the lost frame, the motion vector being an estimated motion vector for the pixel.

10. A computer-readable storage medium as recited in claim 9, wherein in an event the pixel of the lost frame is covered by one or more extrapolated macroblocks, the computer-program instructions for calculating further comprise instructions for determining forward pixel-based motion vector extrapolation estimations by averaging motion vector(s) of the one or more extrapolated macroblocks overlapping the pixel to determine an estimated motion vector for the pixel.

11. A computer-readable medium as recited in claim 6, wherein the computer-program instructions for calculating the bi-directional estimations for each pixel of the lost frame further comprise instructions for:
   combining forward and backward pixel-based MVE operations as follows:
   estimating a pixel p value $p(x, y)$ of the lost frame as $p(x,y)=w \times p_f(x,y)+(1-w) \times p_b(x,y)$, wherein:
   an estimated motion vector for a missing pixel p of the lost frame is represented as $f=(f_x, f_y)$,
   a forward estimation of a motion vector of the missing pixel $p_f(x, y)$ is calculated such that $p_f(x,y)=p_{rf}(x+f_x,y+f_y)$,
   $p_{rf}(x, y)$ refers to pixels in a previous frame to the lost frame, a backward b estimated motion vector is represented as $(b_x, b_y)$, $p_b(x,y)=p_{rb}(x+b_x,y+b_y)$, wherein $p_{rb}(x, y)$ refers to pixels in the last reconstructed frame r, and pixel-based weight $w=w(x, y)$ adjusts weights of the forward and backward pixel-based MVE operations.

12. A computing device comprising:

a processor; and a memory coupled to the processor, the memory comprising computer-program instructions executable by the processor for:

detecting a lost frame during encoded video decoding operations, the lost frame comprising a plurality of pixels and a plurality of macroblocks;

calculating bi-directional estimations for each pixel of the lost frame, wherein the bi-directional estimations comprise backward pixel-based motion vector extrapolation estimations generated by computer-program instructions for compensating a pixel of the lost frame on a last reconstructed frame using a backward estimated motion vector;

generating a current frame for a bi-directional temporal error concealment of the lost frame; and recovering the lost frame with bi-directional error concealment operations.

13. A computing device as recited in claim 12, wherein the bi-directional estimations comprise forward and backward pixel-based motion vector extrapolation estimations.

14. A computing device as recited in claim 12, wherein the bi-directional estimations comprise forward pixel-based motion vector extrapolation estimations such that when an estimated motion vector for a missing pixel of the lost frame is represented as $f=(f_x, f_y)$, a forward estimation of a motion vector of the missing pixel $p_f(x, y)$ is calculated such that $p_f(x,y)=p_{rf}(x+f_x,y+f_y)$, wherein $p_{rf}(x, y)$ refers to pixels in a previous frame to the lost frame.

15. A computing device as recited in claim 12, wherein the computer-program instructions for calculating further comprise instructions for determining forward pixel-based motion vector extrapolation estimations for a pixel of the lost frame that is not covered by at least one extrapolated macroblock by duplicating a motion vector of a similarly situated pixel as the pixel in a previous frame to the lost frame, the motion vector being an estimated motion vector for the pixel.

16. A computing device as recited in claim 12, wherein the computer-program instructions for calculating further comprise instructions for determining forward pixel-based motion vector extrapolation estimations for a pixel of the lost frame that is covered by one or more extrapolated macroblocks by averaging motion vector(s) of the one or more extrapolated macroblocks overlapping the pixel to determine an estimated motion vector for the pixel.

17. A computing device as recited in claim 12, wherein the computer-program instructions for calculating the bi-directional estimations for each pixel of the lost frame further comprise instructions for:

combining forward and backward pixel-based MVE operations as follows:

estimating a pixel p value $p(x, y)$ of the lost frame as $p(x,y)=w\times p_f(x,y)+(1-w)\times p_b(x,y)$, wherein:

an estimated motion vector for a missing pixel p of the lost frame is represented as $f=(f_x, f_y)$, a forward estimation of a motion vector of the missing pixel $p_f(x, y)$ is calculated such that $p_f(x,y)=p_{rf}(x+f_x,y+f_y)$, $p_{rf}(x, y)$ refers to pixels in a previous frame to the lost frame, a backward b estimated motion vector is represented as $(b_x, b_y)$, $p_b(x,y)=p_{rb}(x+b_x,y+b_y)$, wherein $p_{rb}(x, y)$ refers to pixels in the last reconstructed frame r, and pixel-based weight $w=w(x, y)$ adjusts weights of the forward and backward pixel-based MVE operations.

18. A computing device comprising:

detecting means to detect a lost frame during encoded video decoding operations, the lost frame comprising a plurality of pixels and a plurality of macroblocks;

calculating means to calculate bi-directional estimations for each pixel of the lost frame, wherein the bi-directional estimations comprise backward pixel-based motion vector extrapolation estimations generated by computer-program instructions for compensating a pixel of the lost frame on a last reconstructed frame using a backward estimated motion vector;

generating means to generate a current frame for a bi-directional temporal error concealment of the lost frame; and recovering means to recover the lost frame with bi-directional error concealment operations.

19. A computing device as recited in claim 18, wherein the bi-directional estimations comprise forward and backward pixel-based motion vector extrapolation estimations.

20. A computing device as recited in claim 18, wherein the calculating means further comprise determining means to determine forward pixel-based motion vector extrapolation estimations for a pixel of the lost frame that is not covered by at least one extrapolated macroblock by duplicating a motion vector of a similarly situated pixel as the pixel in a previous frame to the lost frame, the motion vector being an estimated motion vector for the pixel.

21. A computing device as recited in claim 18, wherein the calculating means further comprise determining means to determine forward pixel-based motion vector extrapolation estimations for a pixel of the lost frame that is covered by one or more extrapolated macroblocks by averaging motion vector(s) of the one or more extrapolated macroblocks overlapping the pixel to determine an estimated motion vector for the pixel.

22. A computing device as recited in claim 18, wherein the calculating means further comprise:

in an event a pixel of the lost frame is not covered by at least one extrapolated macroblock, determining forward pixel-based motion vector extrapolation estimations by duplicating a motion vector of a similarly situated pixel as the pixel in a previous frame to the lost frame, the motion vector being an estimated motion vector for the pixel;

in an event the pixel of the lost frame is covered by one or more extrapolated macroblocks:

determining forward pixel-based motion vector extrapolation estimations by averaging motion vector(s) of the one or more extrapolated macroblocks overlapping the pixel to determine an estimated motion vector for the pixel; and determining backward pixel-based motion vector extrapolation estimations comprising compensating a pixel $p_b(x, y)$ of the lost frame on a last reconstructed frame using a backward estimated motion vector $(b_x, b_y)$ such that $p_b(x,y)=p_{rb}(x+b_x,y+b_y)$, wherein $p_{rb}(x, y)$ refers to pixels in the last reconstructed frame.

\* \* \* \* \*